Feb. 12, 1963 E. P. WARNKEN 3,077,002
INJECTION MOLDING DEVICE
Original Filed June 4, 1956 3 Sheets-Sheet 3

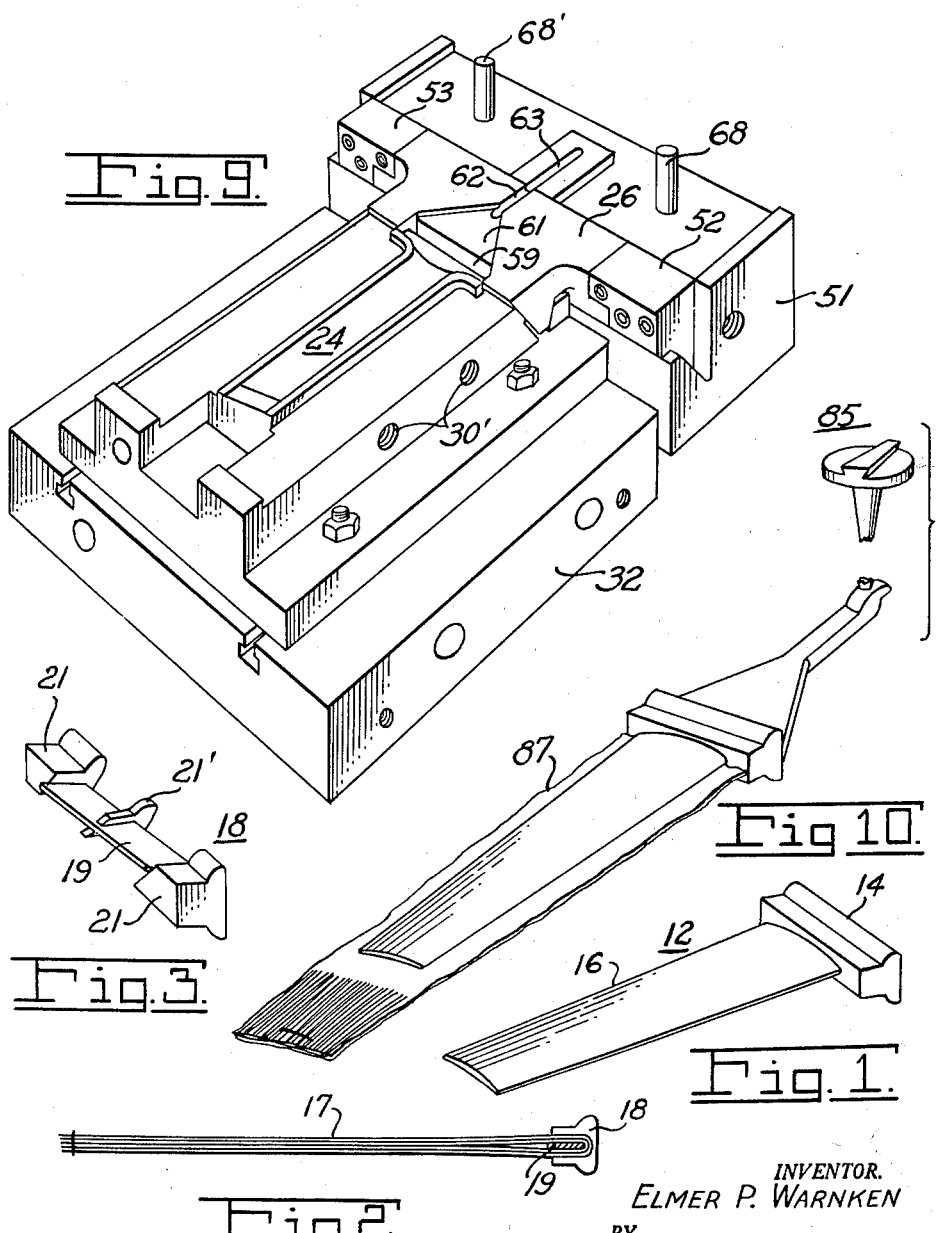

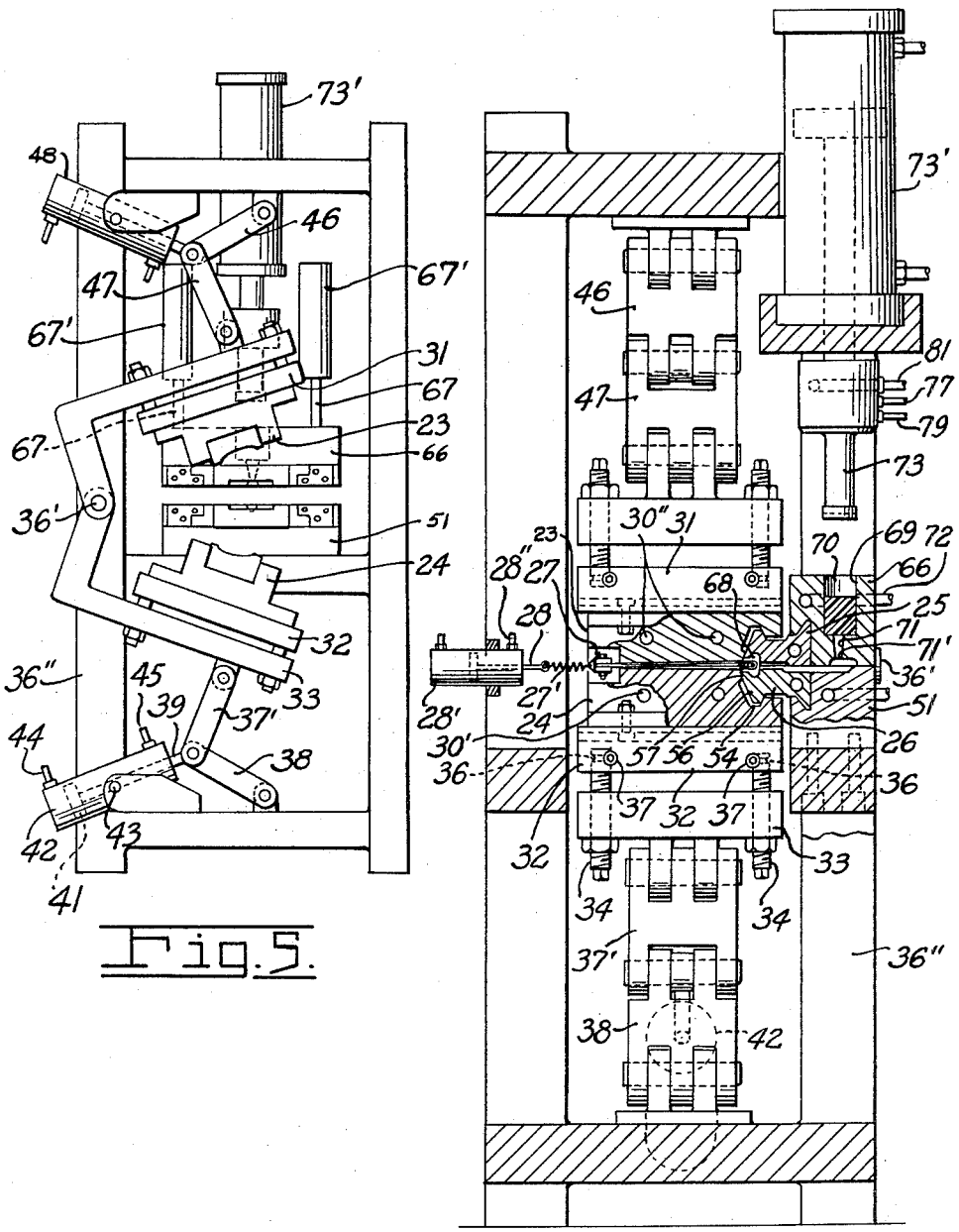

INVENTOR.
ELMER P. WARNKEN
BY
Dale A. Winnie
ATTORNEY

United States Patent Office 3,077,002
Patented Feb. 12, 1963

3,077,002
INJECTION MOLDING DEVICE
Elmer P. Warnken, Cincinnati, Ohio, assignor to Studebaker-Packard Corporation, South Bend, Ind., a corporation of Michigan
Original application June 4, 1956, Ser. No. 589,234, now Patent No. 2,995,777, dated Aug. 15, 1961. Divided and this application Dec. 12, 1960, Ser. No. 75,186
1 Claim. (Cl. 18—30)

This invention relates to a machine for prestressing and molding reinforced plastic members.

This is a division of my co-pending patent application S.N. 589,234 filed June 4, 1956, now Patent No. 2,995,777.

An object of this invention is to provide a machine for molding resin-impregnated fibres of doublet form into an airfoil blade and for prestressing the fibres during molding.

A further object of this invention is to provide a machine of this type having a hollow clamp member for engaging a retainer or bearing member which extends through the doublet loop, together with means for injecting a thermosetting plastic material into the cavity of the hollow clamp member around the retainer member and the doublet loop to encase the loop with plastic.

A further object of this invention is to provide in such a machine a device for injecting plastic material by the transfer method of molding which device includes a pot from which the plastic material is transferred during molding of a blade and means for withdrawing excess plastic material from the pot, after the blade has been molded.

A further object of this invention is to provide a ram and pot arrangement for the transfer molding operation in which the plastic is ejected from the pot through an orifice and in which the lower end of the ram is provided with a dove-tail slot for gathering excess plastic remaining in the pot and in the orifice, and withdrawing the excess plastic when the ram is retracted, the gathered plastic being severed at the orifice.

A further object of this invention is to provide a machine of this character in which a movable clamp holds the free ends of fibres of the doublet and in which means is provided for moving the clamp in a direction to stress the fibres in tension while injecting the plastic material into the cavity of the hollow clamp member and molding the portion of the fibres between the clamps into blade form.

Other objects of the invention will become apparent upon reading the annexed detailed description in connection with the drawing in which:

FIG. 1 is a perspective view of a blade which has been molded in a machine constructed in accordance with an embodiment of this invention;

FIG. 2 is a somewhat schematic view partly in side elevation and partly in section, showing an assembly comprising a root bearing member and resin-impregnated fibres prior to molding, to form the blade of FIG. 1;

FIG. 3 is a perspective view showing the root bearing member;

FIG. 5 is a somewhat schematic view in side elevation of the machine of FIG. 4;

FIG. 6 is a view in section of the machine taken on line VI—VI in FIG. 4;

FIG. 9 is a perspective view showing a lower mold member and a lower clamp member which form a part of the machine; and FIG. 10 is an exploded perspective view showing a molded blade before the blade has been trimmed to remove excess plastic material, together with a plug of additional excess material.

In the following detailed description, and the drawings, like reference characters indicate like parts.

Figure 7:
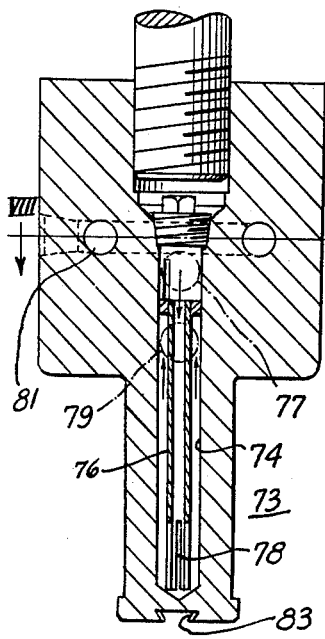
FIG. 7 is a view in vertical section of a ram member embodied in the machine.

In FIG. 1 is illustrated a blade 12 which may be one of the compressor blades of an axial flow jet engine, or the like. The blade 12 includes a root end portion 14 and a blade portion 16. The blade may be of the type described and claimed in my United States Patent 2,859,936.

The blade 12 of FIG. 1 is molded from a plurality of elongated doublet loops 17 of resin-impregnated fibrous material such as resin-impregnated glass cloth, rovings, or the like. The loop of each doublet is at the root end of the blade. A rigid shank member 18 preferably metallic extends through the loop. As shown in FIG. 3, the member 18 includes a relatively thin main portion 19, thickened end portions 21, and a center guide 21'. The loops of the fibres embrace the main portion 19, as shown in FIG. 2.

Figure 4:
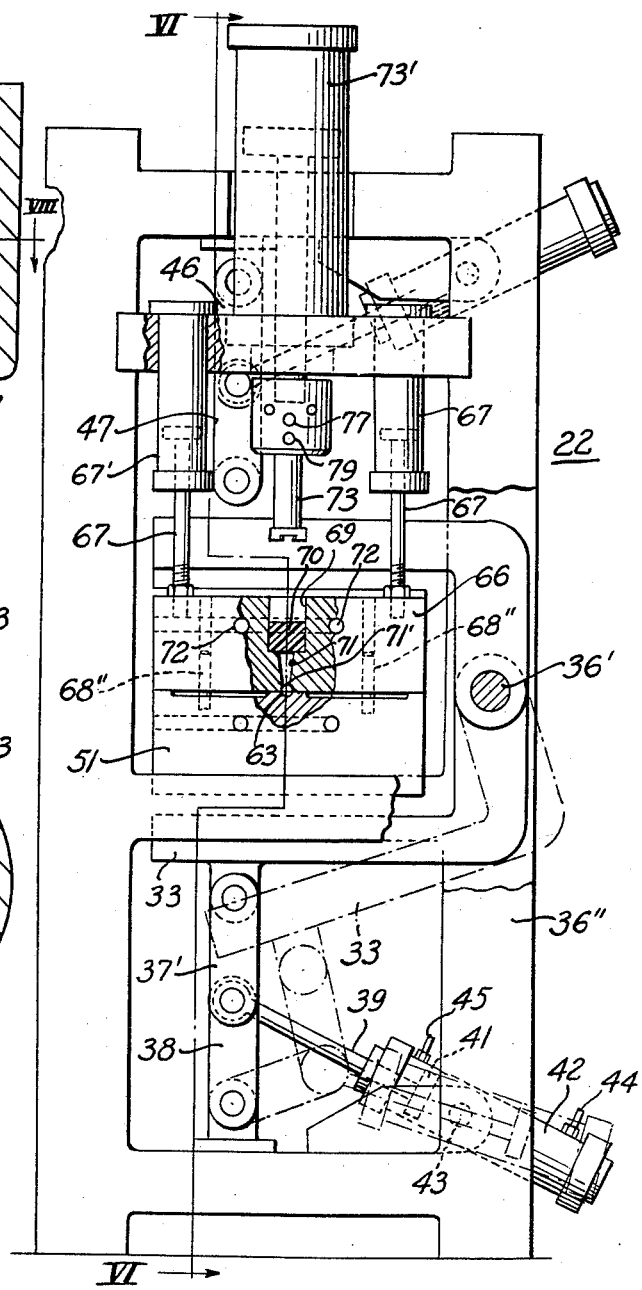
FIG. 4 is a view in side elevation, partly in section, of a machine constructed in accordance with an embodiment of this invention.

The blade is molded in a machine 22 which is illustrated in FIGS. 4, 5 and 6. The machine includes relatively movable molds or dies 23 and 24, in which the fibres are molded to airfoil shape, when the mold is closed. As illustrated, dies 23 and 24 are located one above the other. During molding, rigid member 18 is held between hollow clamping members 25 and 26 (FIG. 6) which will be described in greater detail hereinafter. The loop ends of the doublets are held rigidly in place by the clamping members 25 and 26. The free ends of the fibres are gripped by a movable clamp 27. The clamp 27 is linked by a tension spring 27' to a hydraulically operated piston rod 28. When the rigid member 18 has been clamped in the clamp members 25 and 26, the piston rod 28 is drawn to the left, as shown in FIG. 6, by the action of hydraulic fluid introduced into cylinder 28' through port 28". Thus the fibres are prestressed in tension prior to closing of the molds 23 and 24.

As shown in FIGS. 6 and 9, the mold 24 is provided with bores 30' to which pipe lines (not shown) may be attached for supplying a suitable fluid for heating the mold 24. Mold 23 (see FIG. 6) is similarly provided with bores 30'' for the same purpose.

Mold 23 is mounted on platen 31, and mold 24 is mounted on a similar platen 32. The construction and operation of the supports for both platens are similar, and only the support for platen 32 will be described in detail.

The platen 32 is held in spaced relation to one face of an L-shaped back-up member 33 by a plurality of adjustment screws 34. Each of the screws 34 is threaded to the back-up member 33 and is rotatably mounted in the platen 32. Each screw is provided with a circumferential slot 36. A pin 37, mounted in the platen 32 engages the slot of each of the screws to hold the screws against axial movement with respect to the platen.

The back-up member 33 is pivotally mounted on a pivot 36' carried by a main framework 36'' of the machine so that member 33 can swing from the position shown in full lines in FIG. 4 to the position shown in dot-dash lines. The back-up member 33 is actuated by toggle links 37' and 38 and a piston rod 39 connected to the knee of the links 37' and 38. The rod 39 is connected to a piston 41 operating in a cylinder 42. The cylinder 42 is pivotally mounted on a pivot pin 43 carried by the main framework of the machine. When hydraulic fluid is introduced into the cylinder 42 through port 44, the toggle links and back-up member are advanced from the dot-dash line position to the position shown in full lines (FIG. 4) whereby mold member 24 is placed in die closing position. When hydraulic fluid is introduced into the cylinder 42 through port 45, the toggle links and back-up member move to the open position shown in dot-dash lines in FIG. 4. The upper mold member 23 is actuated to and from die closing position in a similar manner by operation of toggle links 46 and 47 and hydraulic cylinder 48.

When the lower mold member 24 is in closing position, it engages lower clamping member 26, as shown in FIGS. 6 and 9. The lower clamping member 26 is mounted on a block 51. As shown in FIG. 6, the block 51 is rigidly attached to the main framework 36''. The clamp member 26 is attached to the block 51 by means of L-shaped brackets 52 and 53 (see FIG. 9). As shown in FIG. 6, the mold member 24 is provided with a groove 54 that embraces a projection 56 on the lower side of the clamp member 26. The left hand end 57 of the clamp member engages in face-to-face contact with the right hand end of the mold member 24 when the mold member is in die closing position.

As shown in FIG. 9, the clamp member 26 has a hollowed out portion 59 for receiving the blade shank member 18. In addition, a portion of the clamp member is cut away, as indicated at 61, to provide a channel for feeding plastic material to the cavity 59. A milled slot 63 in the block 51 communicates with one end of a slot 62 in the clamp member 26, the other end of the slot 62 communicating with the cut-away portion 61.

As shown in FIG. 6, the upper clamping member 25 is mounted on a movable pot member 66. The pot member 66 is mounted on piston rods 67 (see FIGS. 4 and 5) connected to pistons in cylinders 67' whereby the pot can be raised to the position shown in FIG. 5. When the upper clamping member 25 is in the FIG. 5 position, a roving and shank member assembly of FIG. 2 is placed by mounting the shank member 18 in the hollow cavity 59 of the lower clamp member 26. Then, the pot member 66 and the upper clamp member 25 are lowered to engage and firmly hold the blade shank member 18, as shown in FIG. 6. The upper clamp 25, as shown in FIG. 6, is provided with a hollow portion or cavity 68 for receiving the upper portion of the member 18. As shown in FIG. 9, guide pins 68' are mounted in block 51 and received in sockets 68'' (FIG. 4) in pot member 66 to insure proper alignment thereof.

The pot member 66 includes a cylindrical receptacle or pot portion 69 for receiving a plug 70 of thermosetting plastic material. The plug may be formed of phenol formaldehyde resin containing short fibres of glass which are sufficiently short to be transferred through a small opening with the resin when the resin is rendered fluid.

The receptacle 69 communicates with an outlet opening or orifice 71. The orifice 71 is of inverted, frustroconic shape. The outlet 71' or orifice 71 is the more restricted and communicates with the slot 63 of the block 51, when the pot 66 is in lowered position. The pot 66 is provided with openings 72 through which appropriate heating fluid is introduced to heat the plastic plug in the pot. After the pot member 66 and its clamp 25 have been lowered to clamp the shank member 18 and doublet loops 17 the piston rod 28 is moved to the left to prestress in tension the fibres of the loop 17. While the fibres are so stressed in tension the molds 23 and 24 are then closed on each other about the resin impregnated loops 17 following which a ram 73 is lowered into the pot to transfer plastic material from the pot through the orifice 71, the slots 63 and 62, and the cut-away portion 61 of the lower clamp to the cavity 59, 68 in the clamps surrounding the rigid shank member 18. This transferred plastic material surrounds the doublet loops and fills in the space between the end portions 21 of the member 18 to provide a smooth root end portion for the blade.

Figure 8:
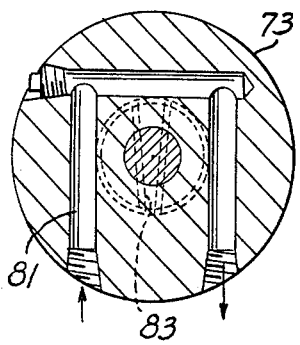
FIG. 8 is a view in section taken on the line VIII—VIII in FIG. 7.

The ram 73 is actuated by a hydraulic cylinder 73' mounted thereabove. Details of construction of ram 73 are shown in FIGS. 7 and 8. The ram is provided with an upright bore 74. A fluid channeling fitting 76 is mounted in the bore 74. Heating fluid is introduced into the bore 74 through an inlet opening 77 and flows down the center of the fitting 76 along the axis of the bore. At the lower end of the fitting 76 the fluid passes through slots 78 into the outer portion of the pot, and back up the bore to be discharged through an outlet opening 79. This fluid heats the lower end of the ram so that, when the ram is driven into the pot, the ram is at a sufficient temperature to maintain the transfer plastic material in a fluid condition as the plastic material is driven out of the pot.

The upper end of the ram is cooled with water which may be introduced through channels 81 in the upper portion of the ram to cool the upper portion, while the lower portion is being heated. The cooling of the upper portion of the ram protects the hydraulic cylinder 73' against over-heating by the heating fluid in the lower portion of the ram.

The lower end of the ram is provided with a dove-tail slot 83 (see FIG. 7). The dove-tail slot (as shown in FIGS. 7 and 8) is wider at one end than at the other, and gathers the excess transfer plastic material in the pot and orifice. Thus, when the ram is retracted from the pot the excess plastic is carried with it, the plastic so carried being severed at the restricted lower end 71' of the orifice 71 (see FIG. 4). The orifice and the pot are thereby scavenged and in a condition to receive another plug of plastic.

In FIG. 10 the shape of the plug of excess plastic material when removed by the ram, is shown at 85. The plug 85 may readily be removed from the ram by sliding off the wide end of the dove-tail slot 83.

When the pot 66 has been raised and the mold members 23 and 24 are separated, the blade may be removed from the mold. A certain amount of flash 87 is formed which is trimmed to form the finished blade shown in FIG. 1.

During molding, the mold members 23 and 24 are heated to a suitable temperature for molding and curing a blade including its root end portion. For a blade formed of phenol formaldehyde resin-impregnated glass fibres, this temperature may be in the order of magnitude of 350° F. The pot 66 and the lower end of ram 73 are heated to a suitable temperature to soften the plastic material so that the plastic material can be transferred, but without curing the same. This temperature may be in the neighborhood of 240° F. for a thermoset plastic material composed of phenol-formaldehyde resin and short fibres of glass.

In the finished blade the transferred material forms a smooth covering for the loops of the doublets and, being of resin similar to the resin of the doublets, becomes an integral part of the blade.

The machine for forming blades which has been described above and illustrated in the drawings, is subject to structural modification without departing from the spirit and scope of the appended claim.

Having described my invention, what I claim as new, and desire to secure by Letters Patent is:

Apparatus for injecting plastic material into a mold and comprising: a reciprocal pot member having a plastic charge receptive chamber provided therein, a ram receptive opening provided at one end of said chamber and a frustro-conical discharge opening provided at the other end thereof, a work clamping member provided on the discharge end of said pot member and reciprocal therewith, mold forming means engaging said work clamping portion and retaining said pot in a charge dispensing relation to said mold means, interconnected passage ways provided from said discharge opening of said pot member and through said clamping portion for communication with said mold forming means, a ram member reciprocal in and apart from said charge receptive chamber and having a dove-tail groove provided in the end thereof, heating means provided within said ram member and next adjacent the dove-tail grooved end thereof, and operative means for activating said ram member for engagement and heat transferring fluidization of a plastic charge disposed in said receptive chamber, said ram being adapted to force said charge through said interconnected mold communicating passage ways and having the dove-tail grooved end thereof retentive of excess charge material for removal thereof from said discharge opening and cleaning of said chamber upon retraction of said ram from said pot.

References Cited in the file of this patent

UNITED STATES PATENTS

| | | |
|---|---|---|
| 2,163,814 | Swarovski | June 27, 1939 |
| 2,471,148 | Gale | May 24, 1949 |
| 2,476,558 | Moxness | July 19, 1949 |
| 2,724,864 | Krotz | Nov. 29, 1955 |
| 2,746,089 | Hendry | May 22, 1956 |
| 2,812,548 | Quinche et al. | Nov. 12, 1957 |

FOREIGN PATENTS

| | | |
|---|---|---|
| 651,725 | Germany | Oct. 18, 1937 |
| 551,468 | Great Britain | Feb. 24, 1949 |